(12) United States Patent
Hahn et al.

(10) Patent No.: US 12,405,091 B2
(45) Date of Patent: Sep. 2, 2025

(54) LIGHT-TRANSMISSIVE MULTISPECTRAL STEALTH DEVICE

(71) Applicant: INDUSTRY-ACADEMIC COOPERATION FOUNDATION YONSEI UNIVERITY, Seoul (KR)

(72) Inventors: Jae Won Hahn, Seoul (KR); Ki Wook Han, Gyeonnggi-do (KR); Hyeon Bo Shim, Seoul (KR)

(73) Assignee: INDUSTRY-ACADEMIC COOPERATING FOUNDATION YONSEI UNIVERSITY, Seoul (KR)

( * ) Notice: Subject to any disclaimer, the term of this patent is extended or adjusted under 35 U.S.C. 154(b) by 405 days.

(21) Appl. No.: 18/087,658

(22) Filed: Dec. 22, 2022

(65) Prior Publication Data

US 2023/0273496 A1   Aug. 31, 2023

(30) Foreign Application Priority Data

Dec. 24, 2021   (KR) ........................ 10-2021-0187179

(51) Int. Cl.
  *F41H 3/00*   (2006.01)
  *B32B 7/025*   (2019.01)
  (Continued)

(52) U.S. Cl.
  CPC .............. *F41H 3/00* (2013.01); *B32B 7/025* (2019.01); *B32B 7/12* (2013.01); *B60J 1/20* (2013.01);
  (Continued)

(58) Field of Classification Search
  CPC .... F41H 3/00; B32B 7/025; B32B 7/12; B60J 1/20; B64C 1/1476; E06B 9/24; E06B 2009/2417; G02F 2203/15
  See application file for complete search history.

(56) References Cited

U.S. PATENT DOCUMENTS

| | | | |
|---|---|---|---|
| 2007/0171120 A1* | 7/2007 | Puscasu | H01Q 15/0066 342/53 |
| 2010/0025533 A1* | 2/2010 | Bimanand | B32B 7/12 244/121 |

FOREIGN PATENT DOCUMENTS

CN    112622391 A  *  4/2021  ........... B23K 26/362

OTHER PUBLICATIONS

Ivar Hamberg and Claes G. Granqvist, "Transparent and infrared-reflecting indium-tin-oxide films: quantitative modeling of the optical properties," Appl. Opt. 24, 1815-1819 (Year: 1985).*

* cited by examiner

*Primary Examiner* — Ladimir Magloire
*Assistant Examiner* — Ashley Brown Raynal
(74) *Attorney, Agent, or Firm* — NORTON ROSE FULBRIGHT US LLP

(57) ABSTRACT

A light-transmissive multispectral stealth device is disclosed. The light-transmissive multispectral stealth device includes a selective wavelength absorption pattern layer including conductive thin-film patterns, wherein each of the conductive thin-film patterns is made of a material capable of transmitting visible light therethrough and having electrical conductivity, wherein the conductive thin-film patterns are capable of inducing an electromagnetic resonance at a first wavelength and a second wavelength different from the first wavelength; a dielectric layer disposed under the selective wavelength absorption pattern layer and made of a dielectric material capable of transmitting the visible light therethrough, wherein the dielectric layer together with the selective wavelength absorption pattern layer induce the electromagnetic resonance; and a reflective layer disposed under the dielectric layer, wherein the reflective layer is made of a material capable of transmitting the visible light (Continued)

therethrough and reflecting at least a portion of an infrared ray therefrom.

15 Claims, 5 Drawing Sheets

(51) Int. Cl.
  *B32B 7/12* (2006.01)
  *B60J 1/20* (2006.01)
  *B64C 1/14* (2006.01)
  *E06B 9/24* (2006.01)
(52) U.S. Cl.
  CPC .............. *B64C 1/1476* (2013.01); *E06B 9/24* (2013.01); *E06B 2009/2417* (2013.01); *G02F 2203/15* (2013.01)

[FIG. 1]
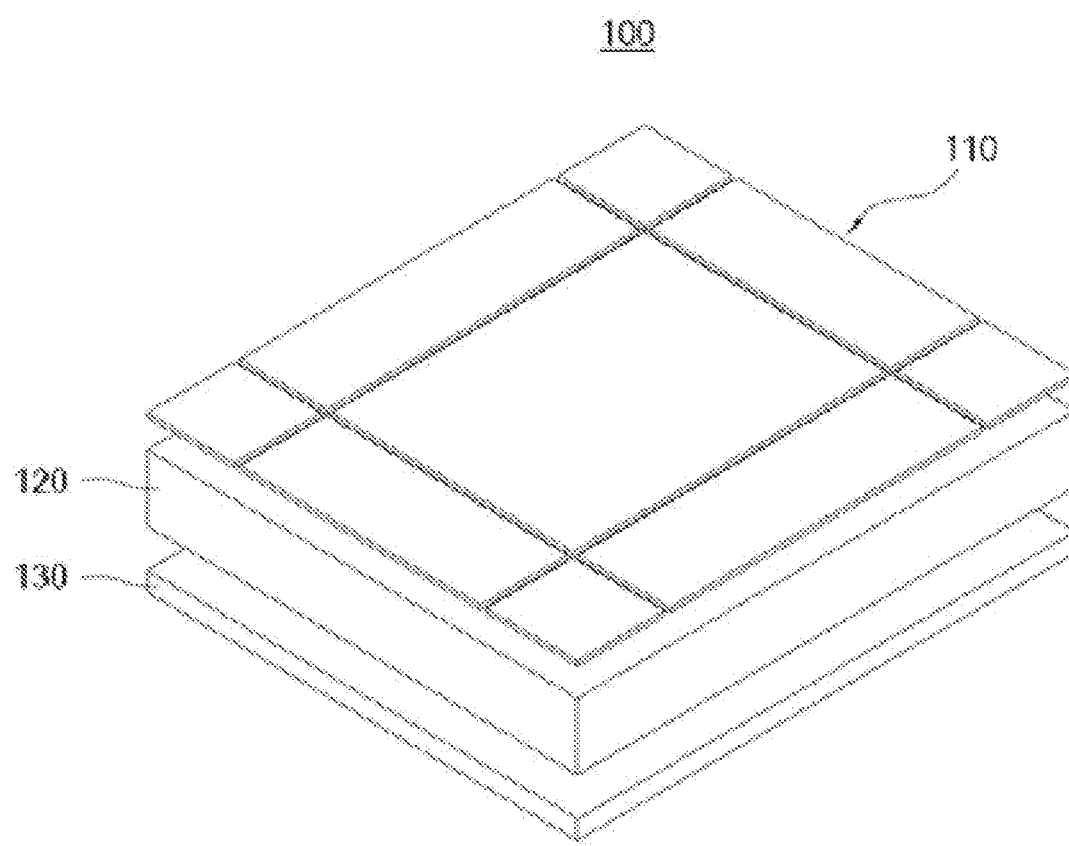

[FIG. 2]
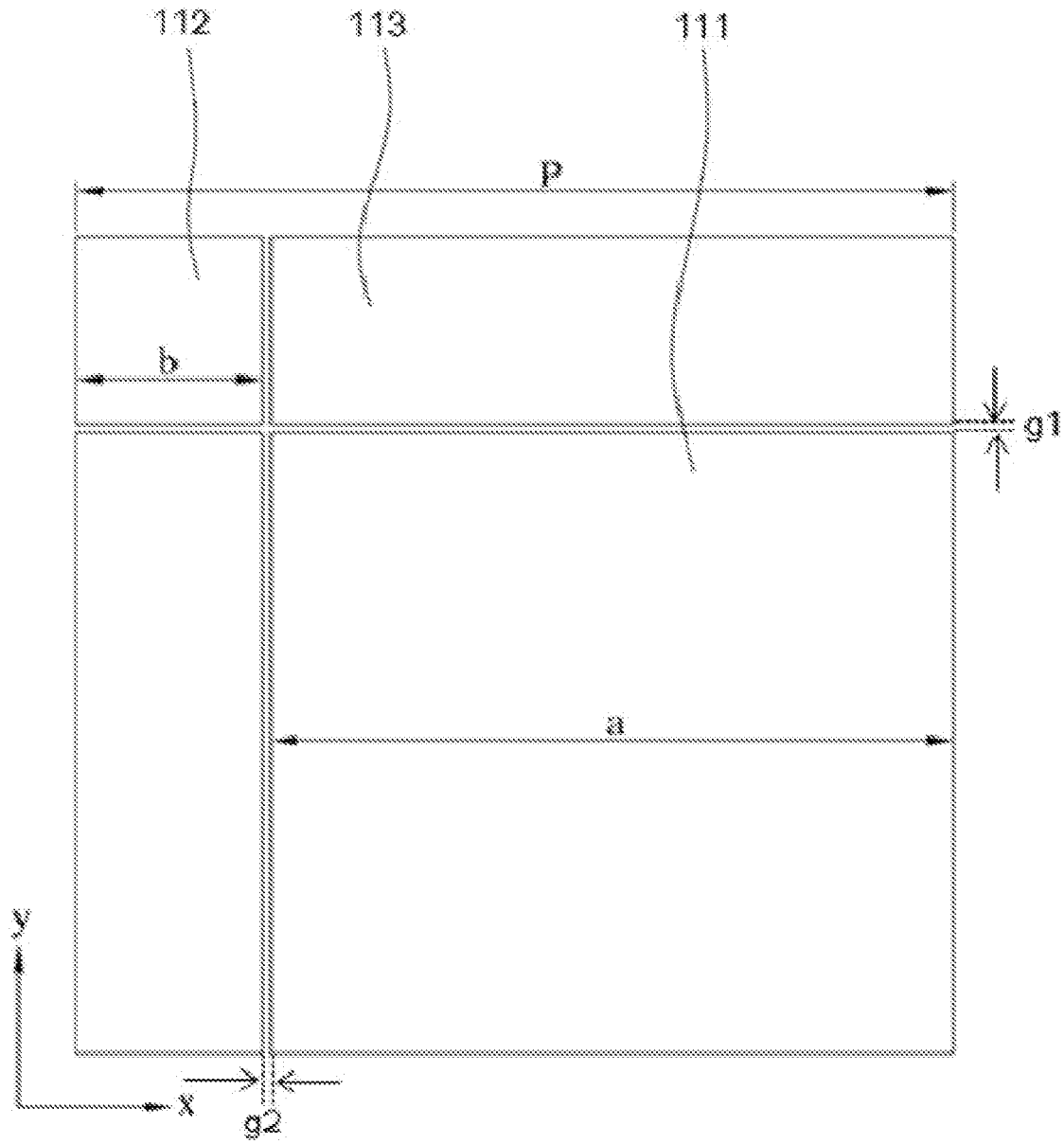

[FIG. 3A]
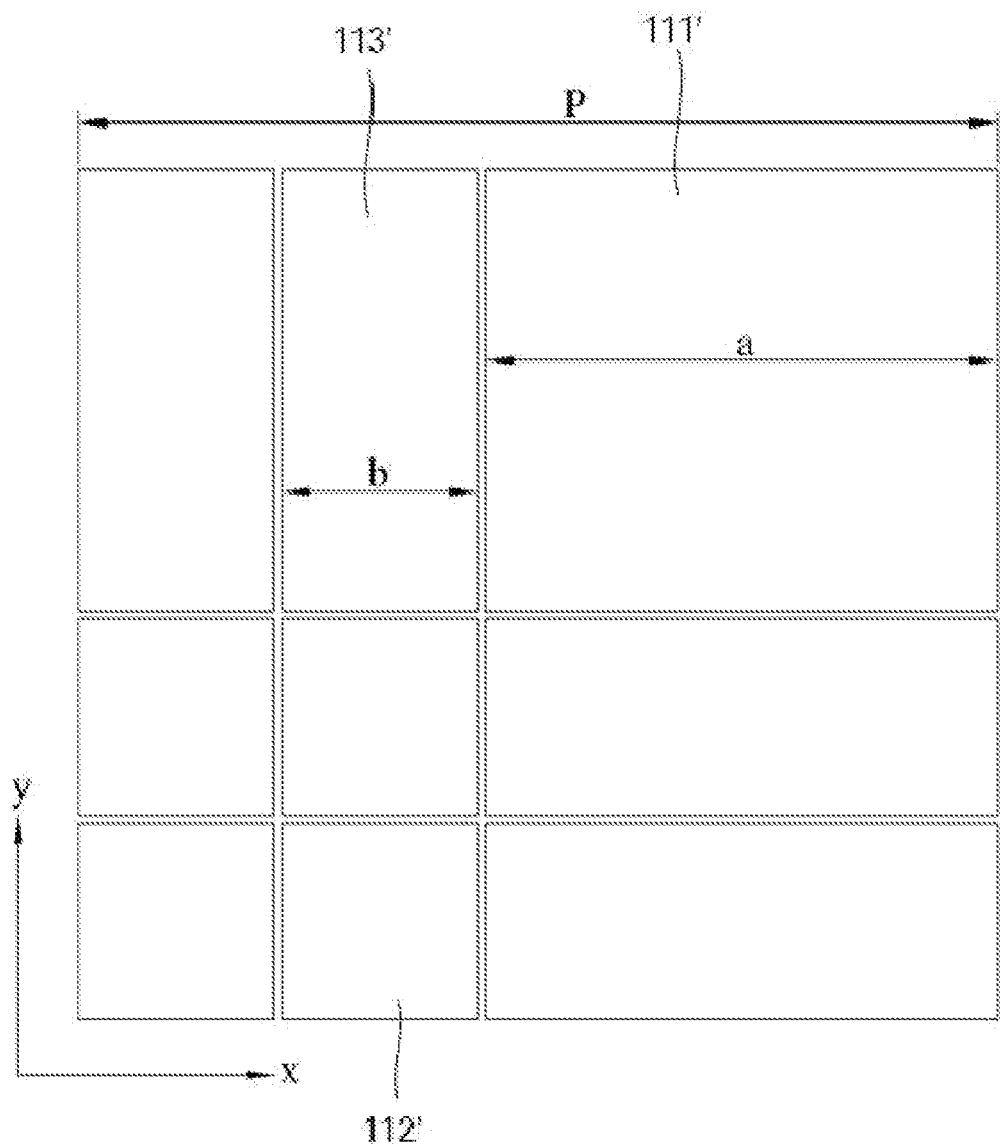

[FIG. 3B]
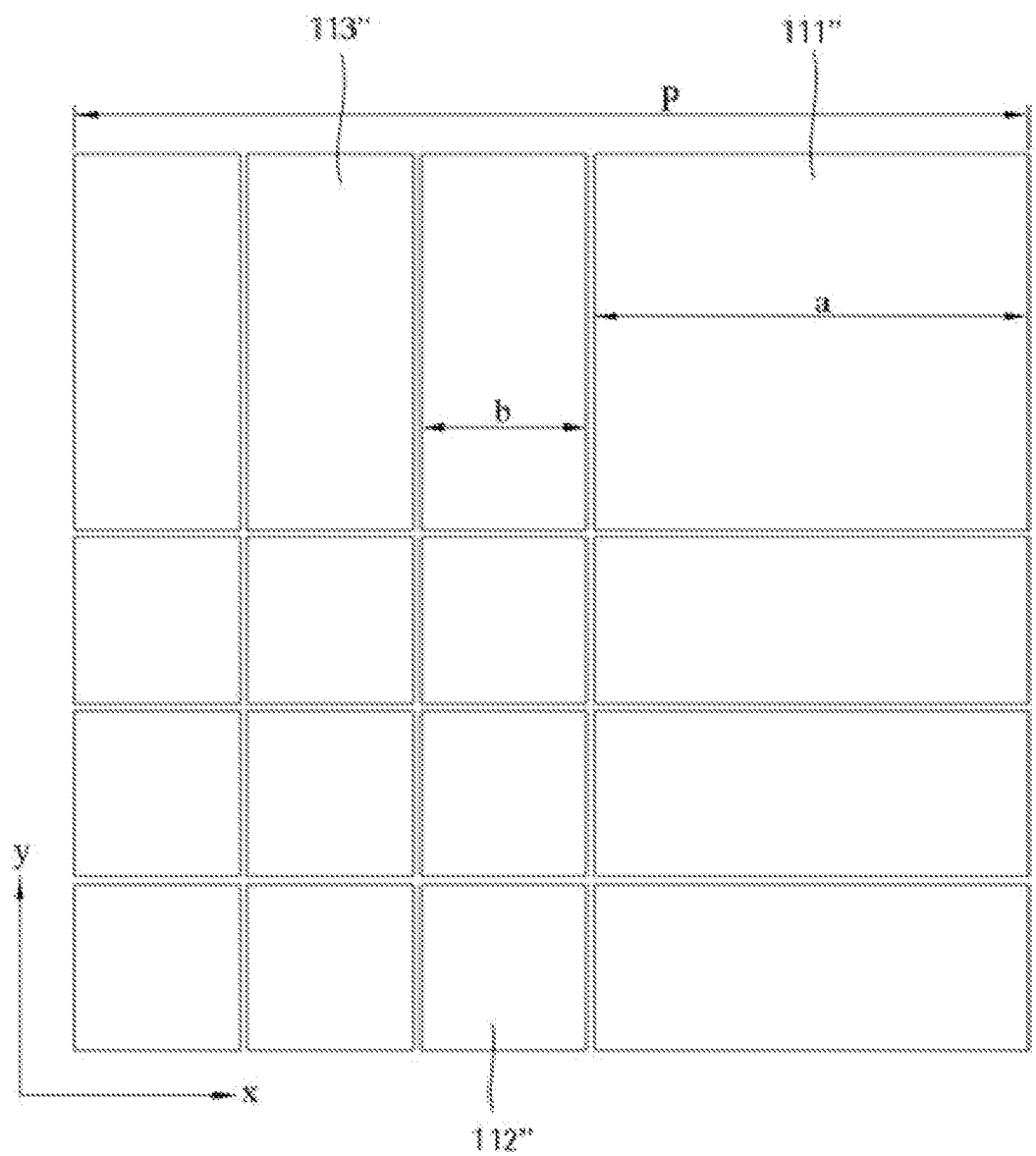

[FIG. 4]
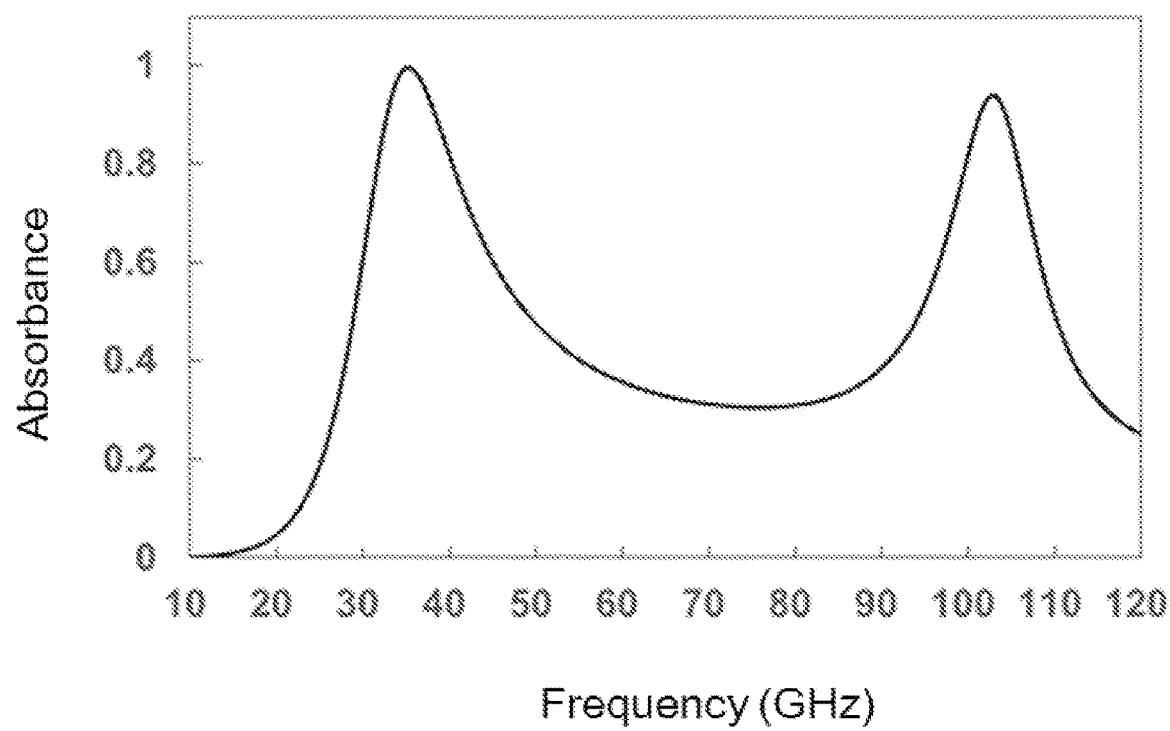

LIGHT-TRANSMISSIVE MULTISPECTRAL STEALTH DEVICE

TECHNICAL FIELD

The present disclosure relates to a light-transmissive multispectral stealth device capable of providing high transmittance of light in a visible light band and coping with an infrared laser detector, a thermal infrared detector, a millimeter wave radar detector, etc.

BACKGROUND ART OF THE INVENTION

Detection technologies used in modern battlefields may be mainly classified into radar and infrared detection technologies. The radar detection scheme detects electromagnetic waves transmitted from an antenna and then reflected from a target. The infrared detection scheme detects a radiation signal emitted from an object based on a temperature mainly under the Planck's law. Stealth technology may generally be defined as a technology that minimizes the radar reflection signal or the infrared radiation signal so as to avoid detection. Based on the principle of each of the detection technologies, radar stealth technology increases the absorption or scattering of the radar signal so as to minimize the radar reflection signal, while infrared stealth technology increases reflection of infrared rays and lowers absorption of infrared rays to lower emissivity to minimize the infrared radiation signal.

Since modern military detection technology uses both radar and infrared detections simultaneously, the development of multispectral stealth materials or devices with both radar stealth and infrared stealth functions has been a challenging task in the field of military stealth technology. In particular, under the recent trend toward miniaturized and unmanned military equipment, the need for multi-spectral stealth materials devices including the millimeter wave band (26.5 to 110 GHz) radar stealth function used for detection of ground equipment and drones is increasing.

Recently, many attempts have been made to apply a frequency selective surface (FSS) which can reflect or transmit incident electromagnetic waves of a specific frequency depending on a structure to the above stealth technology. The FSS device acts as an inductor-capacitor circuit (LC circuit) connected in series or parallel to each other to absorb, reflect, or transmit electromagnetic waves corresponding to a resonant frequency. In previous studies on stealth devices using the FSS, a multi-layered FSS absorber in which an infrared shielding layer (IRSL) and a radar absorbing layer (RAL) are stacked on top of each other has been proposed. However, this multi-layered FSS absorber has an increased thickness such that it is difficult for the same to be applied to a surface requiring blocking of the electromagnetic wave and transparency, such as windows of vehicles and buildings.

DESCRIPTION

Challenge to Solve

One purpose of the present disclosure is to provide a light-transmissive multispectral stealth device capable of providing high transmittance of light in a visible light band and coping with an infrared laser detector, a thermal infrared detector, a millimeter wave radar detector, etc.

Another purpose of the present disclosure is to provide a vehicle, an aircraft or a building including a window on which the stealth device is installed.

Solution to the Problem

The light-transmissive multispectral stealth device according to one aspect of the present disclosure may include a selective wavelength absorption pattern layer including conductive thin-film patterns, wherein each of the conductive thin-film patterns may be made of a material capable of transmitting visible light therethrough and having electrical conductivity, wherein the conductive thin-film patterns are capable of inducing an electromagnetic resonance at a first wavelength and a second wavelength different from the first wavelength; a dielectric layer disposed under the selective wavelength absorption pattern layer and made of a dielectric material capable of transmitting the visible light therethrough, wherein the dielectric layer together with the selective wavelength absorption pattern layer induce the electromagnetic resonance; and a reflective layer disposed under the dielectric layer, wherein the reflective layer may be made of a material capable of transmitting the visible light therethrough and reflecting at least a portion of an infrared ray therefrom.

In one embodiment, each of the selective wavelength absorption pattern layer and the reflective layer may be independently made of one selected from transparent conductive oxide materials, wherein the dielectric layer may be made of a dielectric material capable of transmitting the visible light therethrough.

In one embodiment, each of the selective wavelength absorption pattern layer and the reflective layer may be made of indium tin oxide (ITO).

In one embodiment, the dielectric layer may be made of at least one selected from a group consisting of polyethylene terephthalate (PET), polyvinyl chloride (PVC), polymethyl methacrylate (PMMA), acrylonitrile-butadiene-styrene (ABS) copolymer, polycarbonate (PC), polyaramid, polyimide, polyethylene naphthalate (PEN), silicon oxide ($SiO_2$), and glass.

In one embodiment, the conductive thin-film patterns may have the same thickness, wherein the thickness of each of the conductive thin-film patterns may be in a range of 100 nm to 10 μm.

In one embodiment, the selective wavelength absorption pattern layer may be composed of a plurality of unit areas arranged horizontally, wherein each of the plurality of unit areas may have a square shape having two sides parallel to a first direction and two sides parallel to a second direction perpendicular to the first direction, wherein the conductive thin-film patterns may be disposed in each of the plurality of unit areas, wherein the conductive thin-film patterns disposed in each of the plurality of unit areas may include: one first thin-film pattern having a planar shape of a first square having two sides parallel to the first direction and two sides parallel to the second direction, wherein a length of one side of the first square may be a first length; one second thin-film pattern having a planar shape of a second square having two sides parallel to the first direction and two sides parallel to the second direction, wherein a length of one side of the second square may be a second length smaller than the first length, wherein one of two diagonal lines of the second thin-film pattern and one of two diagonal lines of the first thin-film pattern are in a single line; and two third thin-film patterns, wherein each of the two third thin-film patterns may have a rectangular planar shape having two long sides and two short sides, wherein a length of each of the long sides may be equal to the first length, and a length of each of the short sides may be equal to the second length, wherein one long side of one of the two third thin-film patterns may be adjacent to a first side of the first thin-film pattern and may be parallel to the first direction, wherein one long side of the other of the two third thin-film patterns may be adjacent to a second side of the first thin-film pattern perpendicular to the first side, and may be parallel to the second direction.

In one embodiment, the selective wavelength absorption pattern layer may be composed of a plurality of unit areas arranged horizontally, wherein each of the plurality of unit areas may have a square shape having two sides parallel to a first direction and two sides parallel to a second direction perpendicular to the first direction, wherein the conductive thin-film patterns may be disposed in each of the plurality of unit areas, wherein the conductive thin-film patterns disposed in each of the plurality of unit areas may include one first thin-film pattern having a planar shape of a first square having two sides parallel to the first direction and two sides parallel to the second direction, wherein a length of one side of the first square may be a first length, wherein the first thin-film pattern may be disposed in an area adjacent to a first corner of the unit area; $N^2$ second thin-film patterns arranged in an N×N matrix form and disposed in an area adjacent to a third corner of the unit area facing the first corner in a first diagonal direction of the unit area, wherein each of the second thin-film patterns may have a planar shape of a second square having two sides parallel to the first direction and two sides parallel to the second direction, wherein a length of one side of the second square may be a second length smaller than the first length; and 2N third thin-film patterns, wherein each of the 2N third thin-film patterns may have a rectangular planar shape having two long sides and two short sides, wherein a length of each of the long sides may be equal to the first length, and a length of each of the short sides may be equal to the second length, wherein N third thin-film patterns of the 2N third thin-film patterns may be arranged in an line in the first direction and may be disposed in an area adjacent to a second corner of the unit area adjacent to the first corner, wherein remaining N third thin-film patterns of the 2N third thin-film patterns may be arranged in an line in the second direction and may be disposed in an area adjacent to a fourth corner of the unit area facing the second corner in a second diagonal direction of the unit area, wherein N may be an integer in a range of 2 to 5. In one embodiment, N may be 2 or 3.

In one embodiment, the selective wavelength absorption pattern layer may have an absorption peak at each of a first wavelength corresponding to a frequency range of 20 to 50 GHz and a second wavelength corresponding to a frequency range of 80 to 110 GHz.

In one embodiment, a ratio of the first length to the second length may be in a range of 2 to 400.

A vehicle, an aircraft, or a building according to another aspect of the present disclosure may include a window on which the light-transmissive multispectral stealth device as described above is installed.

Effects of the Invention

According to the light-transmissive multispectral stealth device of the present disclosure, each of the selective wavelength absorption pattern layer, the dielectric layer, and the reflective layer may be made of a material capable of transmitting the visible light therethrough, and thus the light-transmissive multispectral stealth device may have high transmittance of the visible light.

Further, the selective wavelength absorption pattern layer may selectively absorb the electromagnetic waves in the dual frequency bands (35 GHz and 94 GHz) mainly used at the millimeter wave radar. Thus, the light-transmissive multispectral stealth device may implement a dual-band stealth function against the millimeter wave radar. Further, the light-transmissive multispectral stealth device may lower the emissivity of the infrared ray and thus may cope with the thermal infrared detection technology.

BRIEF DESCRIPTION OF DRAWINGS

FIG. 1 is an exploded perspective view for illustrating a light-transmissive multispectral stealth device according to an embodiment of the present disclosure.

FIG. 2 is a plan view for illustrating one embodiment of a selective wavelength absorption pattern layer as shown in FIG. 1.

FIG. 3A and FIG. 3B are respectively plan views for illustrating further embodiments of the selective wavelength absorption pattern layer as shown in FIG. 1.

FIG. 4 is a graph showing a result of FDTD simulation of electromagnetic wave absorption characteristics based on a frequency of the stealth device according to the embodiment.

DETAILED DESCRIPTION FOR INVENTION'S IMPLEMENT

Hereinafter, an embodiment of the present disclosure will be described in detail with reference to the accompanying drawings. The present disclosure may be variously modified and may take many forms. Thus, specific embodiments will be illustrated in the drawings and described in detail herein. However, the specific embodiments are not intended to limit the present disclosure thereto. It should be understood that all changes, equivalents thereto, or substitutes therewith are included in a scope and spirit of the present disclosure. In describing the drawing, similar reference numerals are used for similar components. In the accompanying drawings, it is shown that a dimension of each of structures is enlarged than an actual dimension for clarity of illustration.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description of the present disclosure, a material capable of transmitting visible light therethrough refers to a material having a transmittance of visible light of 70% or greater, for example, 85% or greater.

FIG. 1 is an exploded perspective view for illustrating a light-transmissive multispectral stealth device according to an embodiment of the present disclosure. FIG. 2 is a plan view for illustrating one embodiment of a selective wavelength absorption pattern layer as shown in FIG. 1.

Referring to FIG. 1 and FIG. 2, a light-transmissive multispectral stealth device 100 according to one embodiment of the present disclosure may include a selective wavelength absorption pattern layer 110, a dielectric layer 120, and a reflective layer 130.

The light-transmissive multispectral stealth device 100 of the present disclosure may be disposed on a surface of an object (not shown) such as a window of a vehicle or a building. While the light-transmissive multispectral stealth device 100 transmits visible light therethrough, the light-transmissive multispectral stealth device 100 may exhibit a stealth function against a plurality of frequencies (35 GHz, 94 GHz) bands mainly used at a millimeter wave laser and a stealth function against the thermal infrared detector.

The selective wavelength absorption pattern layer 110 may include a plurality of conductive thin-film patterns 111, 112, and 113 having a constant thickness and capable of transmitting visible light therethrough. The selective wavelength absorption pattern layer 110 together with the dielectric layer 120 and the reflective layer 130 may absorb electromagnetic waves in a predetermined wavelength range using electromagnetic resonance. Further, the selective wavelength absorption pattern layer 110 can reflect at least a portion of infrared rays having a wavelength of about 3 μm or greater, for example, medium-wavelength infrared rays, long-wavelength infrared rays, and far-infrared rays to an outside. Thus, emissivity of the object to which the stealth device 100 of this embodiment is applied may be lowered.

In one embodiment, each of the conductive thin-film patterns 111, 112, and 113 may be made of a transparent electrical conductive oxide such as indium tin oxide (ITO) capable of transmitting the visible light therethrough.

In one embodiment, a thickness of each of the conductive thin-film patterns 111, 112, and 113 is not particularly limited. For example, each of the conductive thin-film patterns 111, 112, and 113 may be formed to have a thickness in a range of about 50 nm to 10 μm, for example, about 50 to 100 nm.

In one embodiment, the conductive thin-film patterns 111, 112, and 113 may cope with a frequency band (35 GHz, 94 GHz) mainly used at the millimeter wave radar. To this end, the conductive thin-film patterns 111, 112, and 113 may cause electrical resonance at a first wavelength and a second wavelength belonging to the millimeter wave range so as to exhibit an absorption peak of an electromagnetic wave at each of the first wavelength and the second wavelength.

In one embodiment, the selective wavelength absorption pattern layer 110 may be composed of a plurality of unit areas which are regularly arranged. Each unit area has a square shape having two sides parallel to a first direction x and two sides parallel to a second direction perpendicular to the first direction x. The plurality of conductive thin-film patterns 111, 112, and 113 may be disposed in each of the unit areas.

For convenience of description, two corners of the unit area positioned at a first diagonal line of two diagonal lines of the unit area are referred to as a first corner and a third corner, respectively. Two corners of the unit area positioned at a second diagonal of the two diagonal lines are referred to as a second corner and a fourth corner, respectively.

In one embodiment, the plurality of conductive thin-film patterns 111, 112, and 113 disposed in one unit area may include one first thin-film pattern 111, one second thin-film pattern 112 and two the third thin-film patterns 113.

The first thin-film pattern 111 may have two sides parallel to the first direction x and two sides parallel to the second direction y, wherein each of the four sides may have a first length a. Thus, the first thin-film pattern 111 may have a planar shape of a first square. The second thin-film pattern 112 may have two sides parallel to the first direction x and two sides parallel to the second direction y, wherein each of the four sides may have a second length b smaller than the first length a. Thus, the second thin-film pattern 112 may have a planar shape of a second square. The first thin-film pattern 111 may exhibit an absorption peak of a wavelength of a low frequency band in a frequency band mainly used at the millimeter wave radar. The second thin-film pattern 112 may exhibit an absorption peak of a wavelength of a high frequency band in the frequency band mainly used at the millimeter wave radar. Each of the third thin-film patterns 113 may have a rectangular planar shape in which a length of each of long sides parallel to the second direction y is equal to the first length a, while a length of short sides parallel to the first direction x is equal to the second length b.

In one embodiment, the first thin-film pattern 111 and the second thin-film pattern 112 may be arranged in the unit area so that each of the first thin-film pattern 111 and the second thin-film pattern 112 has a diagonal line overlapping one of the two diagonal lines of the unit area, and vertexes of the first thin-film pattern 111 and the second thin-film pattern 112 are adjacent to each other. For example, the first the first thin-film pattern 111 may be disposed in a first area adjacent to the first corner of the unit area, and the second thin-film pattern 112 may be disposed in a second area adjacent to the third corner. In another embodiment, the first thin-film pattern 111 may be disposed in a third area adjacent to the second corner of the unit area, while the second thin-film pattern 112 may be disposed in a fourth area adjacent to the fourth corner thereof.

One of the two third thin-film patterns 113 may be disposed adjacent to a first side of the first thin-film pattern 111, and the other thereof may be disposed adjacent to a second side of the first thin-film pattern 111 perpendicular to the first side thereof. For example, one of the long sides of one of the third thin-film patterns 113 may face the first side of the first thin-film pattern 111 and one of short sides of one of the third thin-film patterns 113 may face one side of the second thin-film pattern 112. One of long sides of the other of the third thin-film patterns 113 may face the second side of the first thin-film pattern 111 and one of short sides of the other of the third thin-film patterns 113 may face another side of the second thin-film pattern 112. In this case, the long side of one of the third thin-film patterns 113 and the first side of the first thin-film pattern 111 facing the long side may be spaced apart from each other by a first spacing g1. The short side of one of the third thin-film patterns 113 and one side of the second thin-film pattern 112 facing the short side may be spaced apart from each other by a second spacing g2.

In one embodiment, in order to cope with thermal infrared ray detector, the device should implement low emissivity. To this end, the selective wavelength absorption pattern layer 110 should have increased reflectivity of medium-wavelength infrared rays, long-wavelength infrared rays, and far-infrared rays. To this end, the first to third thin-film patterns 111, 112, and 113 of the selective wavelength absorption pattern layer 110 may have a filling ratio of about 90% or greater, preferably about 95% or greater in the unit area. For example, each of the first spacing g1 between the long side of one of the third thin-film patterns 113 and the first side of the first thin-film pattern 111 facing the long side, and the second spacing g2 between the short side of one of the third thin-film patterns 113 and one side of the second thin-film pattern 112 facing the short side may be in a range of about 10 to 100 μm.

In one embodiment, in order to cope with the millimeter wave (94 GHz and 35 GHz) radar that is mainly applied to the detection of the ground equipment such as tanks and armored vehicles and small unmanned equipment such as drones, the first to third thin-film patterns 111, 112, and 113 of the selective wavelength absorption pattern layer 110 may be configured such that the selective wavelength absorption pattern layer 110 may exhibit an absorption peak at each of the first wavelength corresponding to a frequency range of about 20 to 50 GHz and the second wavelength corresponding to a frequency range of about 80 to 110 GHz.

In an embodiment, in order that the selective wavelength absorption pattern layer 110 exhibits the absorption peak at each of the first wavelength and the second wavelength, a ratio of a length of one side of the first thin-film pattern 111 relative to a length of one side of the second thin-film pattern 112 may be in a range of about 2 to 400, preferably about 5 to 45. In one example, the length of one side of the first thin-film pattern 111 may be in a range of about 1.0 to 4.0 mm, while the length of one side of the second thin-film pattern 112 may be in a range of about 0.01 to 0.5 mm. For example, the length of one side of the first thin-film pattern 111 may be in a range of about 1.3 to 3.0 mm, while the length of one side of the second thin-film pattern 112 may be in a range of about 0.07 to 0.25 mm.

The dielectric layer 120 may be disposed under the selective wavelength absorption pattern layer 110, and may be made of a transparent dielectric material capable of transmitting visible light therethrough. In one embodiment, the dielectric layer 120 may be made of an organic dielectric material such as polyethylene terephthalate (PET), polyvinyl chloride (PVC), polymethyl methacrylate (PMMA), acrylonitrile butadiene styrene (ABS) copolymer, polycarbonate (PC), polyaramid, polyimide, and polyethylene naphthalate, (PEN) or an inorganic dielectric material such as silicon oxide ($SiO_2$) or glass.

In one embodiment, a thickness of the dielectric layer 120 is not particularly limited. For example, the dielectric layer 120 may be formed to have a thickness in a range of about 100 μm to 500 μm. In one example, a direct interface may be formed between the conductive thin-film patterns 111, 112, and 113 and the dielectric layer 120.

The reflective layer 130 may be disposed under the dielectric layer 220, for example, between the dielectric layer 220 and the object, and may be made of a material capable of reflecting at least a portion of the infrared light therefrom and transmitting the visible light therethrough. For example, the reflective layer 130 may be made of a transparent conductive oxide such as indium tin oxide (ITO).

At least a portion of the infrared ray having a wavelength of about 3 μm or greater, for example, medium-wavelength infrared rays, long-wavelength infrared rays, and far-infrared rays may be reflected from the reflective layer 130 to the outside while not reaching the object. Thus, the emissivity of the object to which the stealth device 100 of this embodiment is applied may be lowered.

FIG. 3A and FIG. 3B are respectively plan views for illustrating further embodiments of the selective wavelength absorption pattern layer as shown in FIG. 1.

Referring to FIG. 3A together with FIG. 1, the selective wavelength absorption pattern layer 110 according to another embodiment of the present disclosure may include a plurality of conductive thin-film patterns 111', 112', and 113'. Referring to FIG. 3B together with FIG. 1, the selective wavelength absorption pattern layer 110 according to still another embodiment of the present disclosure may include a plurality of conductive thin-film patterns 111", 112", and 113". The selective wavelength absorption pattern layer 110 may be composed of a plurality of unit areas regularly arranged, wherein each of the plurality of unit areas has a square shape having two sides parallel to the first direction x and two sides parallel to the second direction y perpendicular to the first direction x. The plurality of conductive thin-film patterns 111', 112', and 113' may be disposed in each of the unit areas. Alternatively, the plurality of conductive thin-film patterns 111", 112", and 113" may be disposed in each of the unit areas. The selective wavelength absorption pattern layer according to each of the further embodiments has a larger number of the second thin-film patterns associated with the absorption peak of the high frequency range than that in the selective wavelength absorption pattern layer as shown in FIG. 2. Thus, the selective wavelength absorption pattern layer according to each of the further embodiments may exhibit increased intensity of the absorption peak of the high frequency range as the selective wavelength absorption pattern layer as shown in FIG. 2 may exhibit.

In one embodiment, the plurality of conductive thin-film patterns 111', 112' and 113' or the plurality of conductive thin-film patterns 111", 112", and 113" disposed in one unit area may include one first thin-film pattern 111' or 111", $N^2$ second thin-film patterns 112' or 112", and 2N third thin-film patterns 113' or 113". In this regard, N represents an integer in a range of 2 to 5. For example, when N is 2, the selective wavelength absorption pattern layer as shown in FIG. 3A may be implemented. When N is 3, the selective wavelength absorption pattern layer as shown in FIG. 3B may be implemented.

Descriptions about a planar shape, a thickness, and a material of each of the first to third thin-film patterns 111', 112', and 113' or 111", 112" and 113" may be the same as or similar to the descriptions about the planar shape, the thickness, and the material of each of the first to third thin-film patterns 111, 112, and 113 with reference to FIG. 2. Thus, duplicate detailed descriptions thereof are omitted.

The first thin-film pattern 111' or 111" may be disposed in an area adjacent to one corner in a diagonal line (hereinafter referred to as 'a first diagonal line') of the unit area. The $N^2$ second thin-film patterns 112' or 112" may be arranged in an N×N matrix form and may be disposed in an area adjacent to the other corner in the first diagonal line of the unit area. For example, the $N^2$ second thin-film patterns 112' or 112" may be arranged in a matrix form in the first direction x and the second direction y. In this regard, a diagonal line in which N second thin-film patterns 112' or 112" among the $N^2$ second thin-film patterns 112' or 112" are arranged may coincide with a portion of the first diagonal line of the unit area.

N third thin-film patterns 113' or 113" among the 2N third thin-film patterns 113' or 113" may be disposed in an area adjacent to one corner in a second diagonal line intersecting the first diagonal of one unit area. The remaining N third thin-film patterns 113' or 113" may be disposed in an area adjacent to the other corner along the second diagonal line of the unit area. In this regard, a long side of each of the N third thin-film patterns 113' or 113" disposed in each of the two areas may face one side of the first thin-film pattern 111' or 111", while a short side of each of the N third thin-film patterns 113' or 113" disposed in each of the two areas may face one side of each of the second thin-film patterns 112' or 112".

In one embodiment, the first to third thin-film patterns 111', 112', and 113' or 111", 112", and 113" may have a filling ratio in a range of about 90% or greater, preferably, about 95% or greater in the unit area. To this end, each of a spacing between the first thin-film pattern 111' or 111" and the third thin-film pattern 113' or 113" adjacent thereto, a spacing between the second thin-film pattern 112' or 112" and the third thin-film pattern 113' or 113" adjacent thereto, a spacing between adjacent second thin-film patterns 112' or 112", and a spacing between adjacent third thin-film patterns 113' or 113" may be independently in a range of about 10 to 100 μm.

In one embodiment, the selective wavelength absorption pattern layer 110 may be configured such that the selective wavelength absorption pattern layer 110 may exhibit an absorption peak at each of the first wavelength corresponding to a frequency range of about 20 to 50 GHz and the second wavelength corresponding to a frequency range of about 80 to 110 GHz. To this end, a ratio of a length of one side of the first thin-film pattern 111 to a length of one side of the second thin-film pattern 112 may be in a range of about 2 to 400, preferably about 5 to 45. In one example, the length of one side of the first thin-film pattern 111 may be in a range of about 1.0 to 4.0 mm, while the length of one side of the second thin-film pattern 112 may be in a range of about 0.01 to 0.5 mm. For example, the length of one side of the first thin-film pattern 111 may be in a range of about 1.3 to 3.0 mm, while the length of one side of the second thin-film pattern 112 may be in a range of about 0.07 to 0.25 mm.

According to the light-transmissive multispectral stealth device of the present disclosure, each of the selective wavelength absorption pattern layer, the dielectric layer, and the reflective layer may be made of a material capable of transmitting the visible light therethrough, and thus the light-transmissive multispectral stealth device may have high transmittance of the visible light. Further, the selective wavelength absorption pattern layer may selectively absorb the electromagnetic waves in the dual frequency bands (35 GHz and 94 GHz) mainly used at the millimeter wave radar. Thus, the light-transmissive multispectral stealth device may implement a dual-band stealth function against the millimeter wave radar. Further, the light-transmissive multispectral stealth device may lower the emissivity of the infrared ray and thus may cope with the thermal infrared detection technology.

FIG. 4 is a graph showing the result of FDTD simulation of electromagnetic wave absorption characteristics based on a frequency of the stealth device according to the embodiment as shown in FIG. 2. In FIG. 4, the stealth device of the embodiment has the structure as shown in FIG. 1, the selective wavelength absorption pattern layer includes the first thin-film pattern in a shape of a square with a side length of 1.7 mm, the second thin-film pattern in a square shape with one side length of 0.2 mm, and the third thin-film patterns, each having a rectangular shape with a long side of 1.7 mm and a short side of 0.2 mm. Each of the first to third thin-film patterns is embodied as a 200 nm thick ITO thin-film. Each of the spacing between the first thin-film pattern and the third thin-film pattern and the spacing between the second thin-film pattern and the third thin-film pattern film is 0.05 mm.

Referring to FIG. 4, it may be identified that the stealth device of the embodiment has a high absorption peak in each of a Ka-band (26.5 to 40 GHz) and a W-band (75 to 110 GHz). It may be found that the electromagnetic wave absorbance thereof at the peak frequency exceeds 99%.

Although the present disclosure has been described with reference to preferred embodiments of the present disclosure, those skilled in the art may modify and change the present disclosure variously without departing from the spirit and scope of the present disclosure as described in the Claims below.

The invention claimed is:

1. A light-transmissive multispectral stealth device comprising:
   a selective wavelength absorption pattern layer including conductive thin-film patterns, wherein each of the conductive thin-film patterns is made of a material capable of transmitting visible light therethrough and having electrical conductivity, wherein the conductive thin-film patterns are capable of inducing an electromagnetic resonance at a first wavelength and a second wavelength different from the first wavelength;
   a dielectric layer disposed under the selective wavelength absorption pattern layer and made of a dielectric material capable of transmitting the visible light therethrough, wherein the dielectric layer together with the selective wavelength absorption pattern layer induce the electromagnetic resonance; and
   a reflective layer disposed under the dielectric layer, wherein the reflective layer is made of a material capable of transmitting the visible light therethrough and reflecting at least a portion of an infrared ray therefrom,
   wherein:
   the selective wavelength absorption pattern layer is composed of a plurality of unit areas arranged horizontally,
   each of the plurality of unit areas has a square shape having two sides parallel to a first direction and two sides parallel to a second direction perpendicular to the first direction, wherein the conductive thin-film patterns are disposed in each of the plurality of unit areas, and
   the conductive thin-film patterns disposed in each of the plurality of unit areas include:
   one first thin-film pattern having a planar shape of a first square having two sides parallel to the first direction and two sides parallel to the second direction, wherein a length of one side of the first square is a first length, wherein the first thin-film pattern is disposed in an area adjacent to a first corner of the unit area;
   $N^2$ second thin-film patterns arranged in an N×N matrix form and disposed in an area adjacent to a third corner of the unit area facing the first corner in a first diagonal direction of the unit area, wherein each of the second thin-film patterns has a planar shape of a second square having two sides parallel to the first direction and two sides parallel to the second direction, wherein a length of one side of the second square is a second length smaller than the first length; and
   2N third thin-film patterns, wherein each of the 2N third thin-film patterns has a rectangular planar shape having two long sides and two short sides, wherein a length of each of the long sides is equal to the first length, and a length of each of the short sides is equal to the second length, wherein N third thin-film patterns of the 2N third thin-film patterns are arranged in an line in the first direction and are disposed in an area adjacent to a second corner of the unit area adjacent to the first corner, wherein remaining N third thin-film patterns of the 2N third thin-film patterns are arranged in an line in the second direction and are disposed in an area adjacent to a fourth corner of the unit area facing the second corner in a second diagonal direction of the unit area, wherein N is an integer in a range of 2 to 5.

2. The light-transmissive multispectral stealth device of claim 1,
wherein:
each of the selective wavelength absorption pattern layer and the reflective layer is independently made of one selected from transparent conductive oxide materials, and
the dielectric layer is made of a dielectric material capable of transmitting the visible light therethrough.

3. The light-transmissive multispectral stealth device of claim 2, wherein each of the selective wavelength absorption pattern layer and the reflective layer is made of indium tin oxide (ITO).

4. The light-transmissive multispectral stealth device of claim 2, wherein the dielectric layer is made of at least one selected from a group consisting of polyethylene terephthalate (PET), polyvinyl chloride (PVC), polymethyl methacrylate (PMMA), acrylonitrile-butadiene-styrene (ABS) copolymer, polycarbonate (PC), polyaramid, polyimide, polyethylene naphthalate (PEN), silicon oxide ($SiO_2$), and glass.

5. The light-transmissive multispectral stealth device of claim 1, wherein the conductive thin-film patterns have the same thickness, wherein the thickness of each of the conductive thin-film patterns is in a range of 100 nm to 10 μm.

6. The light-transmissive multispectral stealth device of claim 1, wherein N is 2 or 3.

7. A vehicle including a window on which the light-transmissive multispectral stealth device of claim 1 is installed.

8. An aircraft including a window on which the light-transmissive multispectral stealth device of claim 1 is installed.

9. A building including a window on which the light-transmissive multispectral stealth device of claim 1 is installed.

10. A light-transmissive multispectral stealth device comprising:
a selective wavelength absorption pattern layer including conductive thin-film patterns, wherein each of the conductive thin-film patterns is made of a material capable of transmitting visible light therethrough and having electrical conductivity, wherein the conductive thin-film patterns are capable of inducing an electromagnetic resonance at a first wavelength and a second wavelength different from the first wavelength;
a dielectric layer disposed under the selective wavelength absorption pattern layer and made of a dielectric material capable of transmitting the visible light therethrough, wherein the dielectric layer together with the selective wavelength absorption pattern layer induce the electromagnetic resonance; and
a reflective layer disposed under the dielectric layer, wherein the reflective layer is made of a material capable of transmitting the visible light therethrough and reflecting at least a portion of an infrared ray therefrom,
wherein:
the selective wavelength absorption pattern layer is composed of a plurality of unit areas arranged horizontally, wherein each of the plurality of unit areas has a square shape having two sides parallel to a first direction and two sides parallel to a second direction perpendicular to the first direction,
the conductive thin-film patterns are disposed in each of the plurality of unit areas, and
the conductive thin-film patterns disposed in each of the plurality of unit areas include:
one first thin-film pattern having a planar shape of a first square having two sides parallel to the first direction and two sides parallel to the second direction, wherein a length of one side of the first square is a first length;
one second thin-film pattern having a planar shape of a second square having two sides parallel to the first direction and two sides parallel to the second direction, wherein a length of one side of the second square is a second length smaller than the first length, wherein one of two diagonal lines of the second thin-film pattern and one of two diagonal lines of the first thin-film pattern are in a single line; and
two third thin-film patterns, wherein each of the two third thin-film patterns has a rectangular planar shape having two long sides and two short sides, wherein a length of each of the long sides is equal to the first length, and a length of each of the short sides is equal to the second length, wherein one long side of one of the two third thin-film patterns is adjacent to a first side of the first thin-film pattern and is parallel to the first direction, wherein one long side of the other of the two third thin-film patterns is adjacent to a second side of the first thin-film pattern perpendicular to the first side, and is parallel to the second direction.

11. The light-transmissive multispectral stealth device of claim 10, wherein the selective wavelength absorption pattern layer has an absorption peak at each of a first wavelength corresponding to a frequency range of 20 to 50 GHz and a second wavelength corresponding to a frequency range of 80 to 110 GHz.

12. The light-transmissive multispectral stealth device of claim 11, wherein a ratio of the first length to the second length is in a range of 2 to 400.

13. A vehicle including a window on which the light-transmissive multispectral stealth device of claim 10 is installed.

14. An aircraft including a window on which the light-transmissive multispectral stealth device of claim 10 is installed.

15. A building including a window on which the light-transmissive multispectral stealth device of claim 10 is installed.

* * * * *